United States Patent [19]
Wilbur et al.

[11] Patent Number: 5,048,674
[45] Date of Patent: Sep. 17, 1991

[54] PRODUCT STABILIZER

[75] Inventors: John H. Wilbur, Medford; Michael D. Schey, White City, both of Oreg.

[73] Assignee: Simco/Ramic Corporation, Medford, Oreg.

[21] Appl. No.: 587,641

[22] Filed: Sep. 24, 1990

Related U.S. Application Data

[63] Continuation of Ser. No. 449,499, Dec. 1, 1989, abandoned, which is a continuation-in-part of Ser. No. 337,278, Apr. 11, 1989, abandoned.

[51] Int. Cl.$^5$ .............................................. B65G 21/20
[52] U.S. Cl. .................... 198/836.2; 198/534
[58] Field of Search ................... 198/534, 836.1, 836.2

[56] References Cited

U.S. PATENT DOCUMENTS

| | | | |
|---|---|---|---|
| 1,749,156 | 3/1930 | Pflimlin | 19/236 |
| 3,620,347 | 11/1971 | Wyland | 198/836.2 X |
| 3,908,814 | 9/1975 | Hieronymus | 198/461 |
| 4,696,392 | 9/1987 | Chisholm, Jr. | 198/836.2 |
| 4,830,180 | 5/1989 | Ferguson et al. | 198/836.3 |

FOREIGN PATENT DOCUMENTS

| | | | |
|---|---|---|---|
| 1223753 | 8/1966 | Fed. Rep. of Germany | 198/836 |
| 2001608 | 2/1979 | Fed. Rep. of Germany | 198/836 |
| 2197797 | 9/1973 | France . | |
| 124476 | 9/1979 | Japan | 198/836.2 |
| 1035630 | 7/1966 | United Kingdom . | |
| 8040561 | 8/1981 | United Kingdom . | |

*Primary Examiner*—D. Glenn Dayoan
*Assistant Examiner*—Cheryl L. Gastineau
*Attorney, Agent, or Firm*—Stoel Rives Boley Jones & Grey

[57] ABSTRACT

A product stabilizer for fruits and vegetables on a moving belt includes a very flexible rubber bladder, forming an airtight chamber between two hubs which are mounted for rotation astride the conveyor belt. The bladder is inflated to relatively low pressure less than 1 psi. When the product passes under the pliable surface of the inflated bladder, the bladder conforms to the product and serves to stabilize the product.

26 Claims, 3 Drawing Sheets

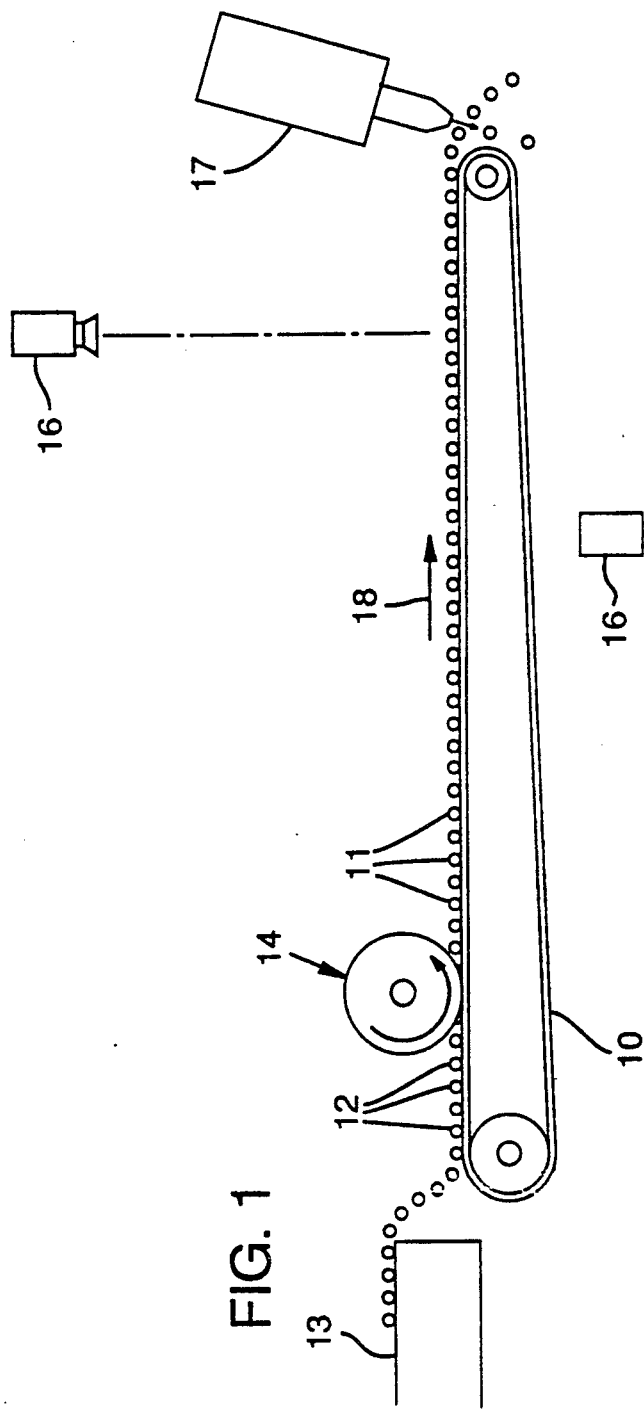
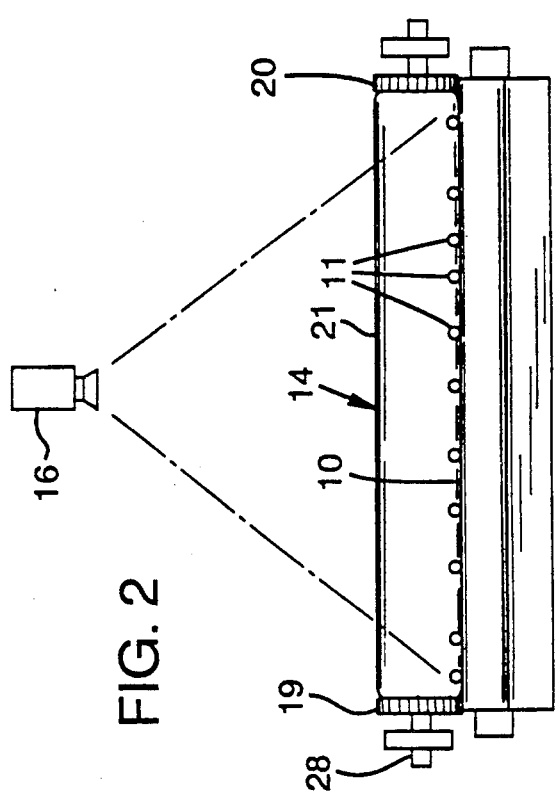

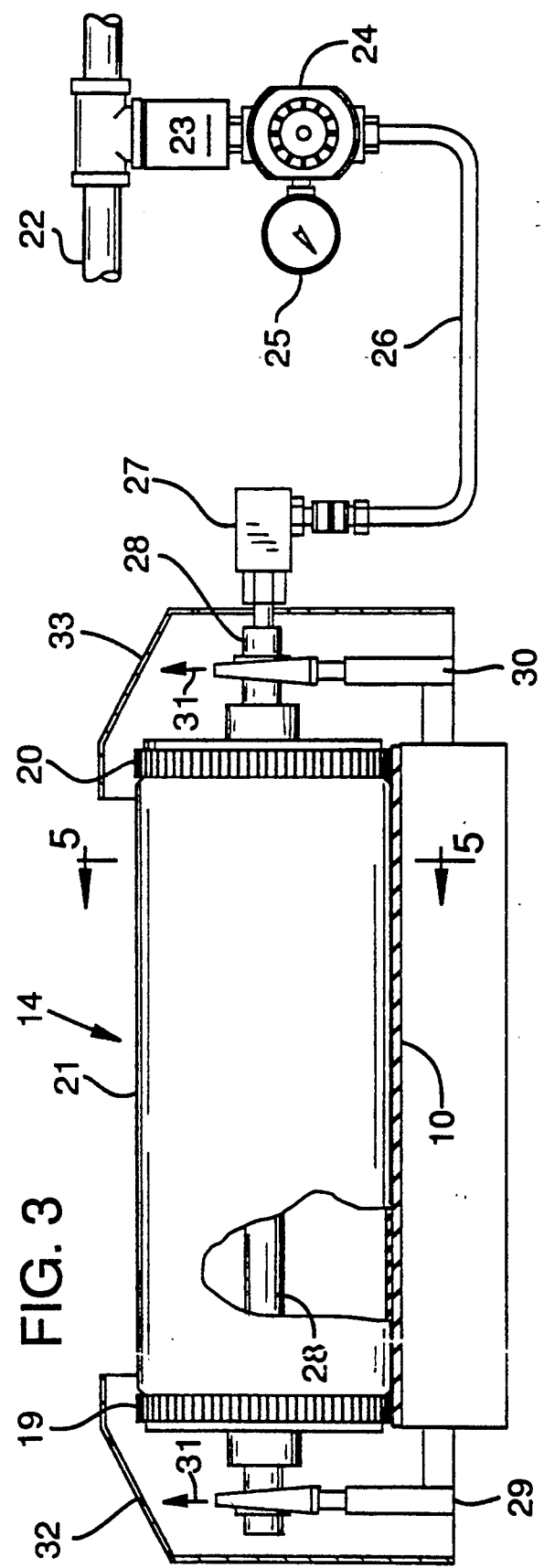
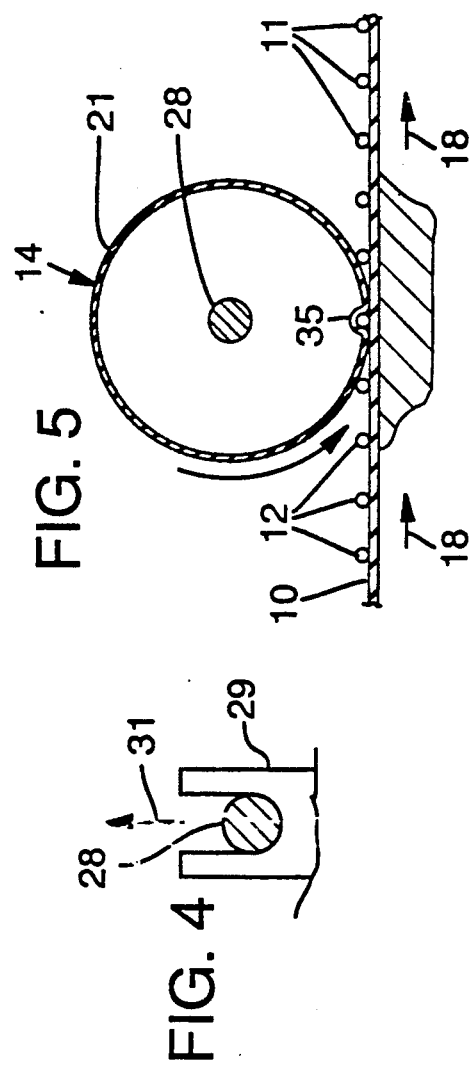

5,048,674

PRODUCT STABILIZER

This is a continuation of application Ser. No. 07/449,499, filed Dec. 1, 1989, now abandoned, which is a continuation-in-part of application No. 07/337,278, filed on Apr. 11, 1989, now abandoned.

The present invention is directed to a product stabilizer and more specifically, to stabilizing fruits and vegetable product moving on a high speed conveyor.

BACKGROUND OF THE INVENTION

In the processing of fruits and vegetables and other similar products, they are generally moved on a high speed conveyor examined by a camera and then cut or ejected to sort out bad or defective product. Naturally, when passing under the camera they should be relatively stable.

Existing techniques for stabilizing such products include a cylinder formed from surgical tubing attached to hubs having wrapped around it a mesh. The hubs are believed to be driven directly off the moving belt. The mesh material rolling against the product on the belt stabilizes it. The foregoing is shown in U.S. Pat. No. 4,830,180. The difficulty with the mesh is that such material tends to pick up some types of product, such as green beans, and there is difficulty in maintaining cleanliness. Another type of wheel is in a paddle wheel format and is constructed of foam rubber. With foam rubber the force rises in an objectionable manner when it is pushed.

OBJECT AND SUMMARY OF THE INVENTION

It is therefore a general object of the present invention to provide an improved product stabilizer.

In accordance with the above object, there is provided a product stabilizer for stabilizing fruit and vegetable products being examined on a moving conveyor belt comprising a pair of hubs astride the belt and in continuous rotatable contact therewith to provide the same linear speed of movement of the hub circumference and the belt. An inflatable bladder is sealed to the hubs for forming an airtight cylinder. A source of pressurized air pressurizes the bladder to a predetermined pressure. The bladder is constructed of a pliable material and inflated to a pressure to easily conform to the fruits and vegetables passing beneath it.

BRIEF DESCRIPTION OF THE DRAWINGS

FIG. 1 is a simplified side view of a conveyor with the stabilizer of the present invention interacting with the product on it.

FIG. 2 is an end view of FIG. 1.

FIG. 3 is a more detailed view of FIG. 2 showing the pressure arrangement.

FIG. 4 is a simplified cross-sectional view of the bearing arrangement of FIG. 3.

FIG. 5 is a greatly enlarged view of a portion of FIG. 1 showing how the product stabilizer interacts with product on a conveyor belt.

DESCRIPTION OF PREFERRED EMBODIMENT

Figure 6:
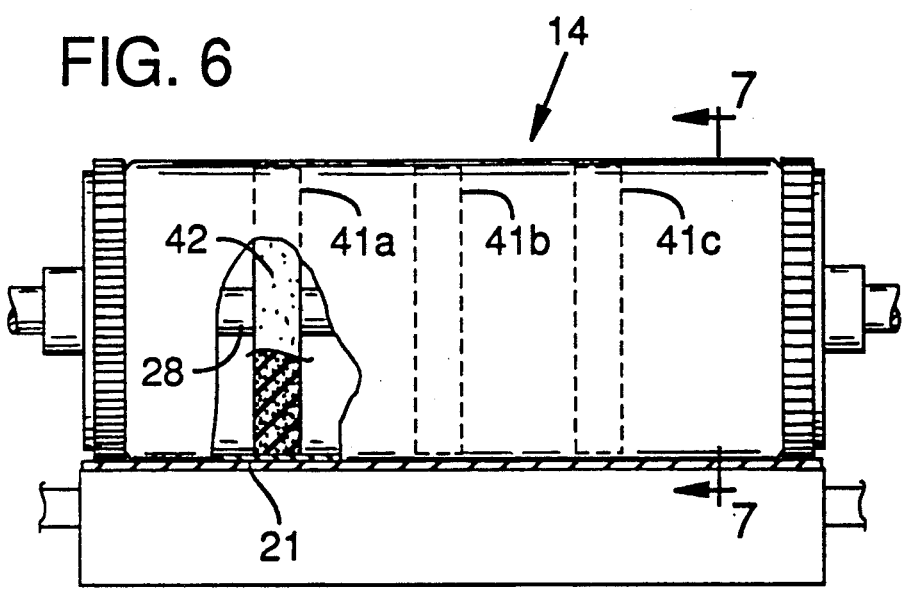
FIG. 6 is an alternative embodiment of FIG. 2.

FIG. 1 shows a standard conveyor belt 10 carrying product 11 which may be generally circular type fruits and also vegetables, such as green beans and carrots. As shown at 11, the product is in a stable condition but at 12 it is unstable since it has just been fed onto the belt by an in-feed mechanism 13. The cylindrical product stabilizer illustrated at 14 by rolling over and contacting the product suppresses any erratic movement—thus stabilizing it.

Thereafter the stabilized product 11 is reviewed by a camera 16 and an ejector 17 takes appropriate action to eject defective product or whatever is the case. The product flow line direction is indicated at 18.

The more detailed end view of FIG. 2 shows the roller 14 fully and how it is formed between the hubs 19 and 20, both of which are in contact with the surface of conveyor 10, the hubs being astride the belt and in continuing rotatable contact therewith. Thus, this provides the same linear speed of the movement of the hub circumference as the belt.

In addition, stretched between the hubs 19 and 20 is an inflatable airtight bladder 21 which forms an airtight cylinder and is constructed of pliable material to conform to various types of products that are placed on the belt.

The optimum material is believed to be Buna-N (sometimes called "Nitrol") which is a 1/32" thick white rubber type material approved by the Food and Drug Administration, which is easily cleaned and offers the flexibility required to conform to a wide variety of product shapes. Typically it has a durometer rating from 60–70. This is in comparison to foam rubber, which has a 55–30 rating which, as discussed above, has the objectionable characteristic of increasing force as it is compressed. Hard rubber or plastic has a rating of 90. Other suitable material is also black Neoprene rubber which is of the same thickness. With such a thickness, the following air pressures in inches of water are suitable: 1) baby white potatoes—5–8; 2) cherries—6–10; 3) peas—8–12; 4) rice—10–20.

With the above pliability and air pressures and with a bladder 21 having a diameter of approximately 7" and a length of 50", the foregoing parameters of pressure and pliability were sufficient to stabilize the above products. Thus, it is apparent that the range of suitable pressures is from 5–20" of water. (24 inches of water is equal to one psi.) A slight increase in thickness and reduction of pliability or flexibility, for example, to 0.042", was found to require greater air pressure of from 2–5 psi. While working satisfactorily for some products, this is believed to be at the edge of usefulness. One reason is that the flexibility or pliability of the material is lost at the greater pressures. In addition, as is discussed below, if the pressure is too great, the roller, since it is freely supported in a vertical direction, will tend to float or lift off.

FIG. 3 illustrates the more detailed mounting and mechanical aspects of the invention. A high pressure air supply line is provided at 22 which may carry standard industrial pressure of 120 psi. Coupled to this is a first stage pressure reducer 23 which may reduce the pressure to 15–20 psi and then a second stage 24, which is variable and includes the gauge 25 which is calibrated for the purposes of the present invention from 0 to 30" of water. The output of the second stage 24 is coupled via a flexible supply hose 26 to a rotating joint 27 which then extends through the axis 28 of the cylinder to the interior of bladder 21 to maintain its inflation.

Axis 28 is suspended on a pair of bearings 29 and 30 as better illustrated in the case of bearing 29 in FIG. 4 so that it is freely movable in a vertical direction 31. The bearing would typically be of a roller bearing type. Protective covers are provided at 32 and 33.

The mounting of FIG. 4 is designed such that after disconnecting the air supply, the roller 14 and its bladder 21 can be lifted off the conveyor without further disassembly. The ease of removal of this assembly simplifies cleaning requirements and speeds conveyor belt replacement. In addition, as discussed above, during operation the free vertical or upward movement prevents any unwanted preloading of the roller 14 on the conveyor 10. This facilitates its stabilizing function For example, the free vertical motion allows any oversize product to pass under the stabilizer and therefore not cause a blockage of flow. And of course, as is apparent from FIG. 3, the vertical mobility of roller 14 is partially made possible by the flexible air supply hose 26.

In order to drive the roller 14 directly off the conveyor belt minimizing chances of a discrepancy in phase or speed between the stabilizing bladder 21 and the conveyor belt 10, each hub 19 and 20 includes as an integral part a lagging strip which is shown in the drawing as serrated, which supplies the required traction at the belt's surface. By this method the speed of the bladder surface matches the linear velocity of the conveyor belt.

The operation of the product stabilizer is best illustrated in FIG. 5 where the bladder 21 of roller 14 is shown as deforming at 35 when passing over a product 12 which was formerly unstable. From an operational point of view, due to the high speed of the conveyor belt 10, product that is dropped onto the belt has a tendency to slide, jump or roll. This happens because there is insufficient friction at the belt surface for the product to accelerate to the same velocity at which the conveyor is traveling. When the product travels under the stabilizer roller 14 the pliable surface of the inflated bladder 2 conforms to the product and suppresses any erratic movement.

Lastly, as shown at 11, after the product is passed beneath the roller 14, it will move along the conveyor belt without shifting position or rolling and thus be effectively imaged by the camera 16, as illustrated in FIG. 1.

Figure 7:
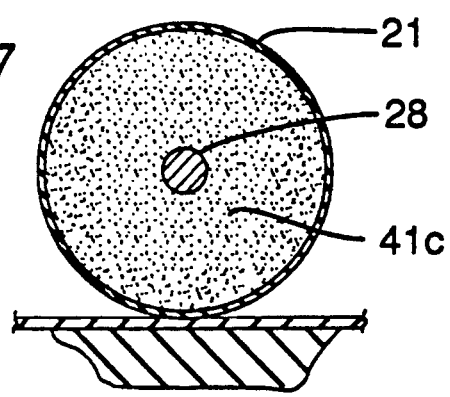
FIG. 7 is a cross-sectional view taken along line 7—7 of FIG. 6.

FIGS. 6 and 7 show an alternative embodiment of the bladder 21 and the overall roller 14 where three sponge rubber disks 41a, 41b and 41c are affixed for rotation on the axis or shaft 28. The sponge rubber is of a very resilient material made of low density open foam. It is force-fit or glued on the shaft 28, as better illustrated in FIG. 7, and preferably by the use of a much smaller hole in the foam than the diameter of the shaft 28.

In the preferred embodiment, three disks are utilized, each disk having a thickness of approximately 1". Thus, for a typical dimension of a hub to hub distance of approximately 48" the disks 41 are spaced on 12" centers. Thus, the total thickness of the three disks (that is, 3") is significantly less than the 48" hub-to-hub distance which is effectively the length of the bladder 21. This allows the air pressure within bladder 21 and the compliancy of the bladder material itself to still substantially determine its ability to conform to the fruits and vegetables passing beneath it.

In addition, the thickness (1") of each disk 41 is much less than its diameter (approximately 7") so that each disk easily bends as well as compresses.

At the same time, each peripheral edge 42 of a disk 41 is substantially contiguous to the bladder 21 so that in effect the bladder contains the disks. This contiguity or physical contact provides for a damping action on the bladder 21 which helps maintain its concentricity during rotation; in other words, whipping is prevented. Such damping might be necessary because of imperfections in the seam of the bladder which would cause an imbalance which at high speeds might cause a "whipping" action. Thus, the disks serve to accommodate these inconsistencies and imperfections and provide damping of the bladder during high speed rotation in order to maintain its contact with the moving product underneath it. In addition, the open cell low density nature of the foam rubber disk does not interfere with the compliancy or the conformance of the bladder 21 to the fruits and vegetables passing beneath it. Rather than the use of resilient material such as foam rubber, other materials such as a sponge material might be suitable.

Thus, an improved product stabilizer has been provided.

We claim:

1. A specimen stabilizer for stabilizing specimens transported on a moving conveyor belt, comprising:
    a pair of rotatable hubs positioned astride and in driving engagement by contact with the conveyor belt; and
    an inflatable bladder constructed of a pliable material and connected between the hubs, the bladder being adapted to receive a pressurizing fluid and inflatable to a generally cylindrical shape that permits the bladder to resiliently conform to specimens passing between it and the conveyor belt.

2. The specimen stabilizer of claim 1 further comprising:
    an axle to which the hubs are mounted for rotation above the conveyor belt; and
    support means for supporting the axle and allowing free upward movement of the axle such that oversized specimens are allowed to pass under the stabilizer.

3. The specimen stabilizer of claim 1 in which the bladder is inflated to and maintained at a pressure of between 5-50 cm of water such that the pressure is variable in accordance with the particular specimens on the conveyor belt.

4. The specimen stabilizer of claim 1 in which the bladder is formed of a rubber-type material having a durometer value within a range of substantially 60-70.

5. The specimen stabilizer of claim 1 in which the pressurizing fluid constitutes a gas.

6. The specimen stabilizer of claim 1 in which the hubs are sealed to the pliable material and function as walls of the generally cylindrical bladder.

7. The specimen stabilizer of claim 1 in which the specimens are food products.

8. The specimen stabilizer of claim 1 in which the specimen stabilizer is adapted for use in a specimen inspection system and functions to stabilize the specimens for inspection on the conveyor belt.

9. The specimen stabilizer of claim 1 in which the bladder is continuously connected to a pressure source via a variable valve.

10. The specimen stabilizer of claim 1 in which the hubs are mounted for rotation on an axle, and a plurality of axially spaced damping disks formed of resilient material are mounted for rotation with the axle and contained within the bladder such that peripheral edges of the disks are substantially contiguous with the bladder.

11. The specimen stabilizer of claim 10 in which the disks comprise low density resilient material of open cell foam rubber.

12. The specimen stabilizer of claim 10 in which each of the disks has a predetermined thickness that is significantly smaller than the diameter of each disk, thereby enabling bending as well as compression of each disk.

13. The specimen stabilizer of claim 12 in which the cumulative thickness of the disks is substantially less than the axial distance between the hubs so that fluid pressure within the bladder substantially determines the ability of the bladder to conform to the specimens.

14. A specimen inspection system having a specimen stabilizer to stabilize specimens for inspection, comprising:
   an optical inspection device;
   conveyor means for conveying specimens along a path past the optical inspection device;
   a pair of rotatable hubs positioned astride and in driving engagement by contact with the conveying means; and
   an inflatable bladder constructed of a pliable material and connected between the hubs, the bladder being adapted to receive a pressurizing fluid and inflatable to a generally cylindrical shape that permits the bladder to resiliently conform to specimens passing between it and the conveying means.

15. The specimen processing system of claim 14 in which a pressure source is continuously connected to the bladder via a pressure valve that is controlled to maintain the generally cylindrical shape of the bladder.

16. The specimen processing system of claim 14 in which the specimens are food products.

17. A method for stabilizing specimens transported on a moving conveyor belt, comprising:
   inflating with a pressurizing fluid to bladder constructed of a pliable material to create a bladder of substantially cylindrical shape, the inflated bladder being connected between a pair of hubs positioned astride and in driving engagement by contact with the conveyor belt;
   depositing specimens onto the conveyor belt; and
   transporting the specimens on the conveyor belt to pass them between the bladder and the conveyor belt such that the bladder substantially conforms to the specimens and stabilizes them on the conveyor belt.

18. The method of claim 17 in which the specimens are of various shapes, the fluid constitutes a gas, and the bladder is continuously connected to a pressure source and inflated to maintain a predetermined pressure.

19. The method of claim 17 in which the hubs are mounted for rotation on an axle, and a plurality of axially spaced damping disks formed of resilient material are mounted on the axle for rotation with the axle and contained within the bladder such that peripheral edges of the disks are substantially contiguous with the bladder.

20. The method of claim 19 in which each of the disks has a predetermined thickness that is significantly smaller than the diameter of each disk, thereby enabling bending as well as compression of each disk.

21. A specimen stabilizer for stabilizing specimens transported on a moving conveyor belt, comprising:
   a pair of rotatable hubs positioned astride and in driving engagement with the conveyor belt; and
   an inflatable bladder constructed of a pliable material and connected between the hubs, the bladder being continuously connected to a pressure source and adapted to receive a pressurizing fluid such that the bladder is inflatable to a generally cylindrical shape that permits the bladder to resiliently conform to specimens passing between it and the conveyor belt.

22. The specimen stabilizer of claim 21 in which the hubs are sealed to the pliable material and function as walls of the generally cylindrical bladder such that the bladder is substantially air tight.

23. The specimen stabilizer of claim 21 in which the pressurizing fluid constitutes gas, the specimens are food products, and the specimen stabilizer is adapted for use in a specimen inspection system and functions to stabilize the specimens for inspection on the conveyor belt.

24. The specimen stabilizer of claim 21 in which the hubs are mounted for rotation on an axle, and a plurality of axially spaced damping disks formed of resilient material are mounted for rotation with the axle and contained within the bladder such that peripheral edges of the disks are substantially contiguous with the bladder.

25. The product stabilizer of claim 21 in which each of the disks has a predetermined thickness that is significantly smaller than the diameter of each disk, thereby enabling bending as well as compression of each disk.

26. The product stabilizer of claim 21 in which the rotatable hubs contact the conveyor belt and have substantially the same circumference as the bladder.

* * * * *